(No Model.)

C. L. BASTIAN.
VALVE.

No. 477,192. Patented June 14, 1892.

Witnesses
Wm. N. Rheem
F. A. Hopkins

Inventor
Chas. L. Bastian
By Elliott & Cushman
Atty's.

UNITED STATES PATENT OFFICE.

CHARLES L. BASTIAN, OF CHICAGO, ILLINOIS, ASSIGNOR TO LAWRENCE M. ENNIS, OF SAME PLACE.

VALVE.

SPECIFICATION forming part of Letters Patent No. 477,192, dated June 14, 1892.

Application filed August 17, 1891. Serial No. 402,805. (No model.)

*To all whom it may concern:*

Be it known that I, CHARLES L. BASTIAN, a citizen of the United States, residing at Chicago, in the county of Cook and State of Illinois, have invented certain new and useful Improvements in Stop-Cocks, of which the following is a full, clear, and exact specification, reference being had to the accompanying drawings, forming part of this specification, and in which—

Figure 1:
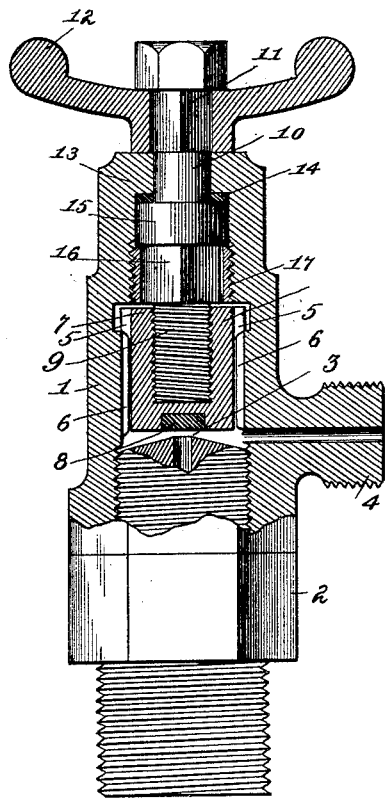
Figure 3:
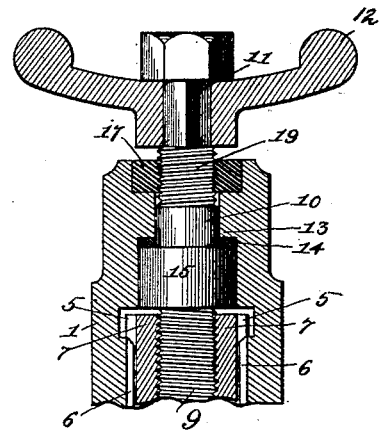
Figure 2:
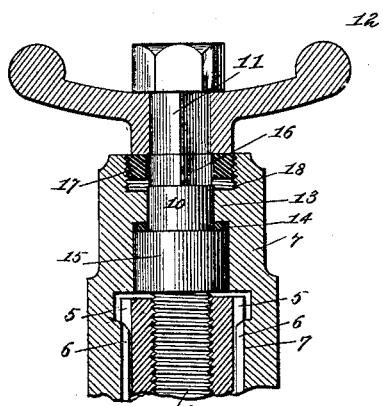
Figure 4:
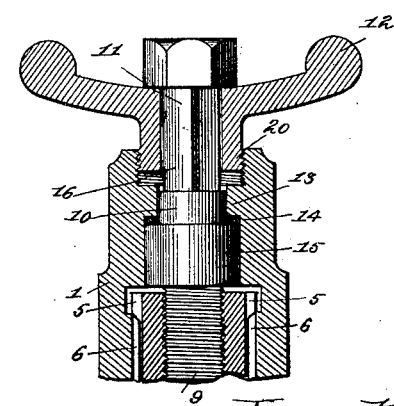

Figure 1 is a vertical longitudinal section of the preferred form of my invention, and Figs. 2, 3, and 4 are similar views illustrating different modifications hereinafter more fully described in the order in which they occur.

My invention relates to valves or cocks for general purposes, but is more particularly designed for use on soda-water fountains or other vessels used for a similar purpose. It has for its object to provide an inexpensive and durable cock which will avoid the necessity of employing the usual stuffing-box and packing around the valve-stem and yet will effectually prevent leakage from the housing at that point either when the valve is open or closed. It is well known by those familiar with the art that considerable difficulty has been experienced in preventing the leakage of valves employed for governing high-pressure fluids, especially when the valve is open or off its seat and the fluid has not free egress from the housing, as is the case with soda-water fountains.

With these ends in view I have designed a stop-cock which will effectually overcome the difficulties heretofore existing, which consists in certain features of novelty, hereinafter particularly pointed out in the claims, and which I will now describe with reference to the drawings.

In the drawings like signs of reference refer to like parts throughout the several views.

1 is the valve-housing of any suitable form and material, having the attaching-nut 2, upon the outer end of which is formed a conical valve-seat 3, the housing being provided on the side or other convenient point with the usual discharge-nozzle 4. Formed longitudinally in the valve 7 are two grooves or channels 5, in each of which is seated a spline 6, formed within the housing 1, thus preventing such valve from rotating, while its freedom of movement longitudinally within the housing is not interfered with. This valve is provided at one end with a soft facing 8 and at its other with a screw-threaded socket, which extends throughout the greater part of its length, as shown. Seated within this screw-threaded socket is the screw-threaded end 9 of a rotary longitudinally-movable valve-stem 10, whose upper end 11 is prismatic and carries an actuating disk or knob 12, as shown; but of course any other means for rotating the valve-stem may be supplied, if desired. The outer end of the housing 1, where it surrounds the valve-stem, is formed with a shoulder or flange 13, against which rests a leather, rubber, or other suitable gasket 14, which latter, when the valve-stem moves upward, is impinged by a shoulder or supplemental valve 15, formed on the valve-stem. Between this shoulder and the screw 9 the stem is provided with a square or prismatic portion 16, which fits within a sleeve or nut 17, having a complementary interior, so that the rotary movement of the stem will be imparted to the nut, and the latter at the same time will be allowed longitudinal movement independently of the stem. The exterior of this sleeve or nut 17 is provided with screw-threads, which are of opposite pitch to the threads on the end 9 of the stem. I have shown the threads on the end 9 as left-hand and those on the nut as right-hand threads; but this order may be reversed, if desired.

From the foregoing it will be understood that when the valve-stem is rotated to the right nut 17 will move toward the valve-seat and the threaded end 9 of the valve-stem through its tendency to screw out of the socket in the valve will cause the latter to move toward its seat and impinge the same with great force, and inasmuch as it finds its abutment to do this against the top or outer end of the housing the shoulder or supplemental valve 15 will impinge the gasket 14 with an equal force, and thus prevent leakage from the back-pressure.

When the valve-stem is turned to the left to open the valve, the threaded end 9 will raise the valve from its seat by reason of its tendency to screw down into the threaded socket; but since the stem is practically fixed against longitudinal movement by the hand-knob and the same movement causes the right-hand thread of nut 17 to move the latter outward, carrying the stem with it, if it be movable, the valve, also, will be caused to move outward as the threaded end of the stem is turned within the threaded socket. Hence it will be seen that by continued revolution of the stem the shoulder or valve 15 may be forced against the gasket 14 with any desired degree of force, thus effectually preventing leakage while the main valve is open.

In the form shown in Fig. 2 I provide the housing 1 with an external screw-threaded socket 18, and in the latter I arrange the threaded nut or sleeve 17, instead of having the same within the housing, as in Fig. 1. The nut 17 engages under the knob 12, and when the valve-stem is turned for opening the valve the nut will force the stem outward, as before explained.

In the form shown in Fig. 3 the nut 17 is secured against rotation in the outer end of the housing, and it is provided with internal instead of external threads. In this instance the valve-stem is provided with a threaded neck 19, which engages in the nut 17 and causes the shoulder or valve 15 to impinge the gasket 14 when the stem is turned, as already described.

In Fig. 4 instead of having a separate nut, as 17, I form threads on the lower part of the operating-knob, as shown at 20, which engage in the threaded socket 18 in the outer end of the housing, as in Fig. 2, the operation being the same.

By forming the nut 17 integrally with the hand-knob 12 it will be seen that any strain tending to tilt the knob will be resisted by the nut, and the valve-stem thus relieved of such strain, and breakage or bending of the stem, which might otherwise occur, is avoided.

Having described my invention, what I claim, and desire to secure by Letters Patent, is—

1. The combination, with the housing having a valve-seat, of a reciprocating valve held against rotation, a valve-stem having screw-threaded connection with said valve and being provided with a shoulder, and a nut having threads of opposite pitch to said threaded connection between the stem and the valve, adapted to force said shoulder against the end of the housing, substantially as set forth.

2. The combination, with the housing having a valve-seat, of a reciprocating valve held against rotation, a valve-stem having screw-threaded connection with said valve and being provided with the shoulder 15 and prismatic portion 16, and a nut fitting on said prismatic portion and having external threads engaging in the housing and being capable of movement independently of the valve, substantially as set forth.

3. The combination, with the housing having a valve-seat, of a valve having spline-and-groove connection with the housing, a valve-stem having screw-threaded connection with said valve and being provided with the shoulder 15 and prismatic portion 16, a nut or sleeve fitting on said portion 16 and having external threads of different pitch from said threaded connection between the stem and valve, and a gasket surrounding the stem between shoulder 15 and the end of the housing, substantially as set forth.

4. The combination, with the housing having a valve-seat, of a reciprocating valve held against rotation, a valve-stem having screw-threaded connection with said valve and being provided with a shoulder, a nut having threads of opposite pitch to said threaded connection between the stem and the valve, adapted to force said shoulder against the end of the housing, and a hand-wheel or knob secured rigidly to said nut for rotating the valve-stem, substantially as set forth.

5. The combination, with the housing having a valve-seat, of a reciprocating valve held against rotation, a valve-stem having screw-threaded connection with said valve, a shoulder or supplemental valve carried by said stem, a nut having threads of opposite pitch to said threaded connection between the stem and the valve, adapted to force said shoulder or supplemental valve against the end of the housing, and a hand-wheel on said stem for rotating it, formed integrally with said nut, substantially as set forth.

6. The combination of the housing having the threaded socket and a valve-seat, a reciprocating valve held against rotation, a valve-stem having threaded connection with said valve and being provided with a shoulder adapted to come against the end of the housing, a nut located in said socket and having threads of opposite pitch to the pitch of the threaded connection between the valve and stem, and a hand-wheel formed integrally with the nut and being secured to the valve-stem with capability of moving longitudinally thereon, substantially as set forth.

7. The combination, with the housing having a valve-seat and the threaded socket, of a reciprocating valve held within said housing against rotation, a valve-stem having a threaded end 9, engaging in said valve, and a prismatic portion, a shoulder or supplemental valve carried by said valve-stem, a nut having a prismatic interior fitted upon said prismatic portion of the valve-stem and being located within the said socket, and a hand wheel or knob formed integrally with said nut, the threads of said nut being right-hand threads and the threads on the end 9 of the stem being left-hand threads and of greater pitch than the threads of the nut, substantially as set forth.

CHARLES L. BASTIAN.

Witnesses:
F. O. HOPKINS,
SAMUEL E. HIBBEN.